(12) United States Patent
Suzuki

(10) Patent No.: US 6,799,905 B2
(45) Date of Patent: Oct. 5, 2004

(54) LENS PROTECTOR

(75) Inventor: Shinji Suzuki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/667,573

(22) Filed: Sep. 23, 2003

(65) Prior Publication Data

US 2004/0081448 A1 Apr. 29, 2004

(30) Foreign Application Priority Data

Sep. 26, 2002 (JP) ........................................ 2002-280910

(51) Int. Cl.$^7$ ............................................... G03B 17/00
(52) U.S. Cl. ..................................... 396/448; 359/511
(58) Field of Search ........................ 396/448; 348/373; 359/511

(56) References Cited

U.S. PATENT DOCUMENTS

| 5,913,089 A | * | 6/1999 | Ebe ............................. 396/448 |
| 6,334,718 B1 | * | 1/2002 | Akiba et al. ................. 396/448 |
| 2001/0048473 A1 | * | 12/2001 | Gotanda ..................... 348/207 |

FOREIGN PATENT DOCUMENTS

| JP | 05-216092 | 8/1993 |
| JP | 2593878 | 2/1999 |

* cited by examiner

Primary Examiner—David M. Gray
(74) Attorney, Agent, or Firm—Sughrue Mion, PLLC

(57) ABSTRACT

In a lens protector, a lens barrier is divided into two blades. The two blades are mounted on a shaft in such a manner that the two blades are able to revolve around the shaft. A revolving guide for one of the two blades is provided on a cabinet. A revolving guide for another of the two blades is provided along a blade surface of said one blade.

10 Claims, 5 Drawing Sheets

LENS PROTECTOR

BACKGROUND OF THE INVENTION

1. Field of the Invention

The present invention relates to a lens protector for protecting a lens, which is mounted on a camera and the like.

2. Description of the Related Art

In a camera wherein a barrier for a lens protection is mounted at a cabinet side, there is adopted a measure for saving space in which a two-bladed structure of barrier is provided so that the barrier is stored on a superposition basis or is saved separately at the right and left. However, according to the prior art, there is provided such an arrangement that the barrier is moved in a horizontal direction. This structure needs a large number of parts such as racks, pinions, levers and the like. Accordingly, it takes a large cost and needs a corresponding space for storing those parts.

For example, there is known a technology (Japanese Utility Model Registration No. 2593878) which relates to a plurality of movable barrier units opening and closing in a direction perpendicular to an optical axis with respect to a lens aperture of a lens barrel cover top portion, wherein there are provided a travelling direction rack, a gear engaging with the rack, a driving rack, and an operational member. This technology is suitable for a small and light type of camera, since it simply needs a small mounting space and a little number of parts. However, according to this technology, the rack moves to a projecting position at the time of the opening of the lens aperture, and thus this technology is not sufficiently suitable for compactness. Further, this technology needs a large number of parts such as a plurality of racks, pinions and gears.

Further, there is known a barrier unit comprising two-divided barriers, a connecting lever for connecting those barriers with one another, a holding section for holding the barriers at an opening position or a closing position, and a receiving plate forming a travelling space, wherein a geometry of the two-divided barriers and the receiving plate is a part of a spherical shell having the same spherical center (cf. for example, Japanese Patent Application Laid Open Gazette Toku-Kai Hei. 5-216092 (paragraph 0007)). This barrier unit is simple in structure and does not have many parts, and is compact. Further, this barrier unit is effective to prevent erroneous stop of the barrier and also to stably hold the barrier at the opened position. Thus this barrier unit has a high operability, durability and functional ability. According to this barrier unit, the barrier moves horizontally, and is a manual operating unit. And thus this barrier unit needs parts such as a link and a return spring, and thereby needing a large space in a horizontal direction.

SUMMARY OF THE INVENTION

In view of the foregoing, it is an object of the present invention to provide a lens protector, which is simple in structure and contributes to saving a space.

To achieve the above-mentioned objects, the present invention provides a lens protector that covers a lens aperture of a cabinet on an open and close basis, wherein the lens protector has a lens-protecting barrier consisting of two barrier blades, which are rotatably mounted around one shaft to cover the lens aperture on a sharing basis, and are superposed upon each other when saved from the lens aperture.

According to the lens protector of the present invention as mentioned above, a two-blade barrier is driven in accordance with a coaxial revolving system. This feature makes it possible to contribute to simplifying the structure of the device and thereby reducing the number of parts.

In the lens protector according to the present invention as mentioned above, it is preferable that the cabinet has a revolving guide that guides a revolution of one of the two barrier blades. Here, it is also preferable that said one barrier blade has a revolving guide that guides a revolution of another barrier blade.

This feature makes it possible to implement providing of two blades of the barrier, even if the barrier has geometry that the barrier drops out from the guide of the cabinet. Thus, according to the present invention, it is possible to provide a barrier mechanism advantageous in cost and space.

In the lens protector according to the present invention as mentioned above, it is preferable that the two barrier blades consist of a half moon shaped barrier blade that covers a part of the lens aperture and another barrier blade of a wane portion.

In the lens protector according to the present invention as mentioned above, it is preferable that the lens protector further has a driving device that causes the two barrier blades to revolve around the shaft.

This feature makes it possible to automatically open and close the barrier blades.

DETAILED DESCRIPTION OF PREFERRED EMBODIMENTS

Embodiments of the present invention will be described with reference to the accompanying drawings.

Figure 1:
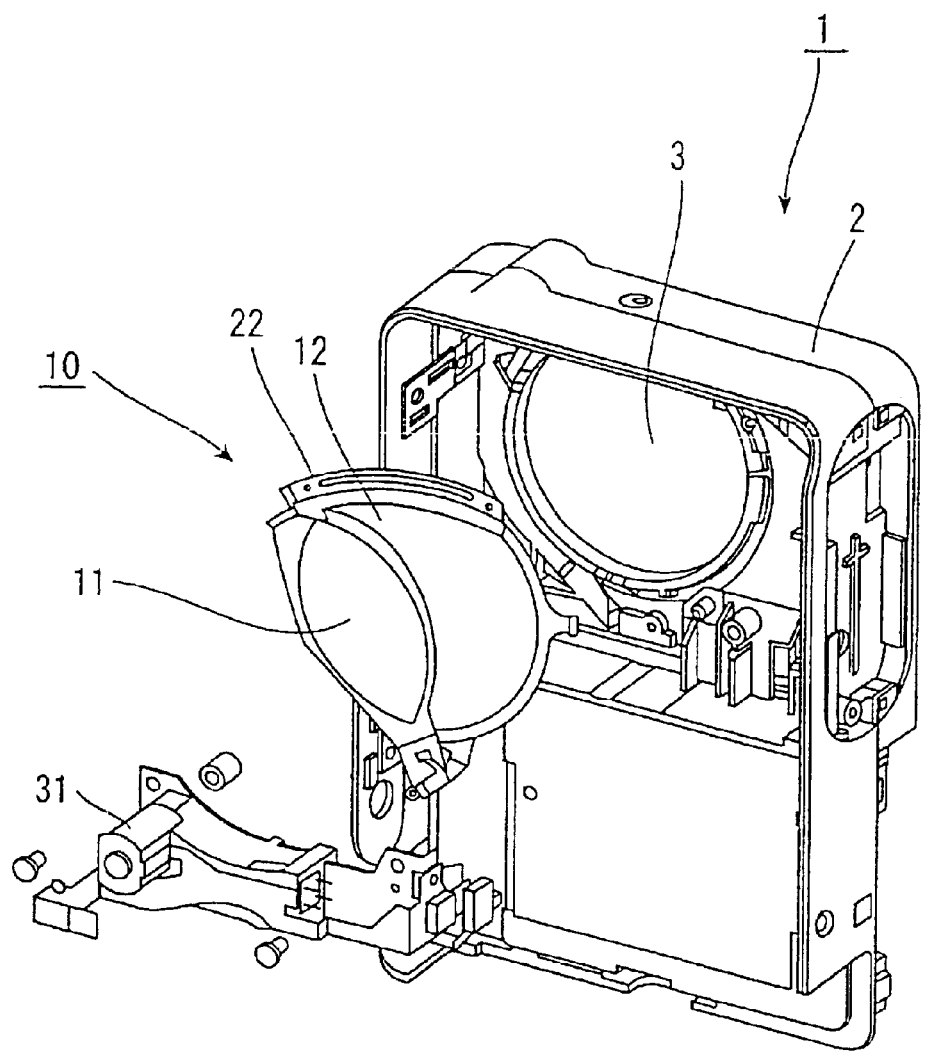
FIG. 1 is an exploded perspective view of a lens protector according to an embodiment of the present invention.
Figure 2:
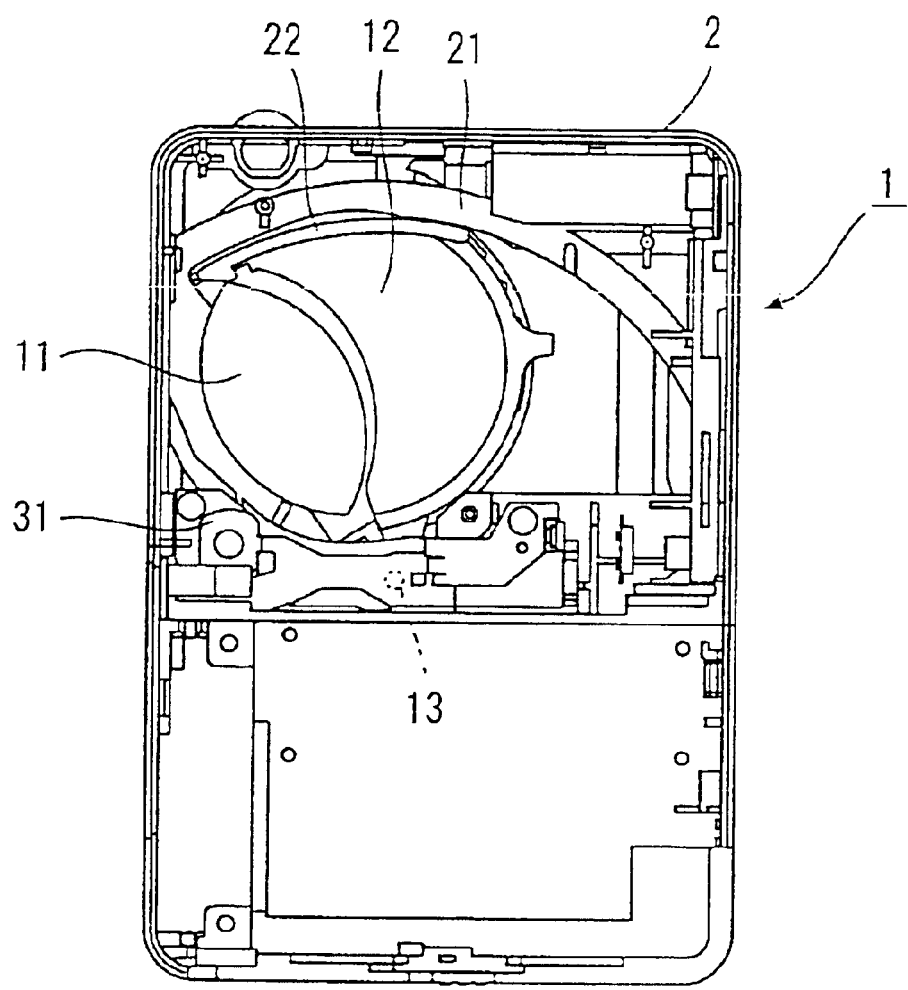
FIG. 2 is a rear elevation of the assembled lens protector according to the embodiment of the present invention.
Figure 3:
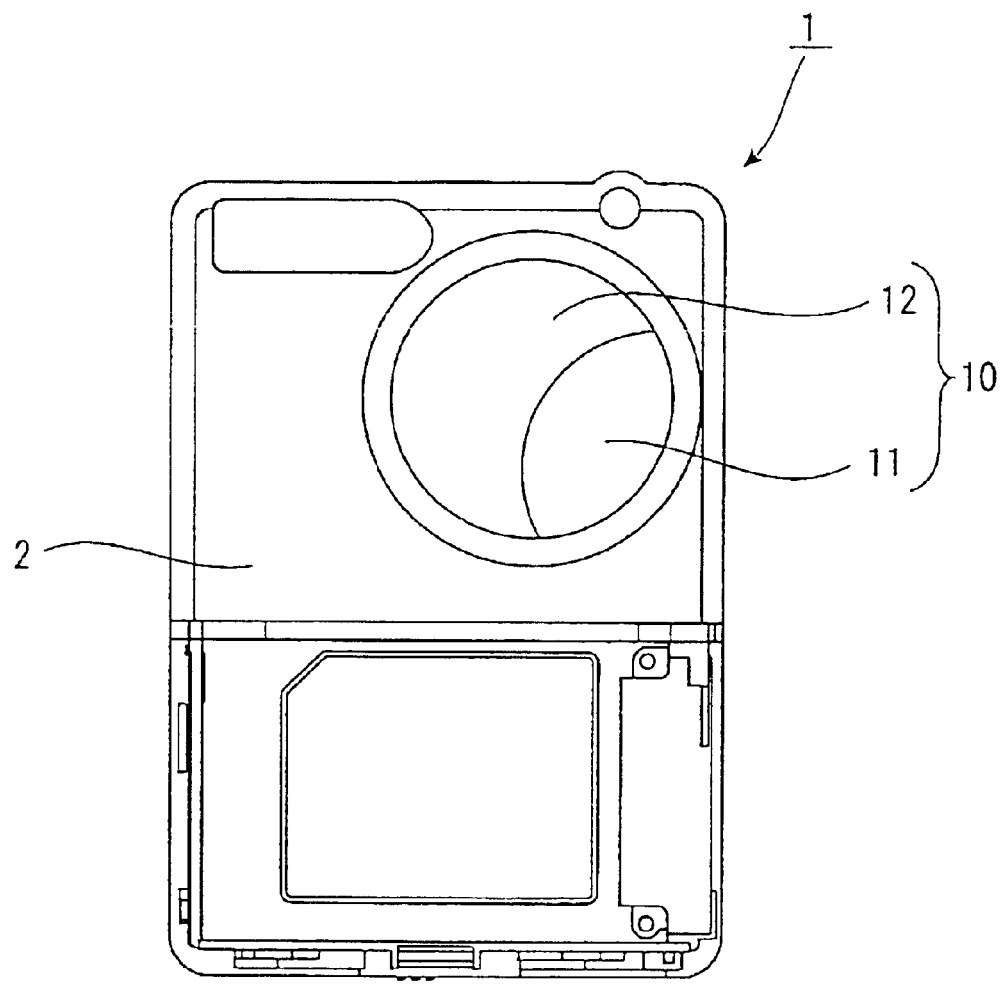
FIG. 3 is a front elevation of a camera in a state that a barrier is closed.
Figure 4:
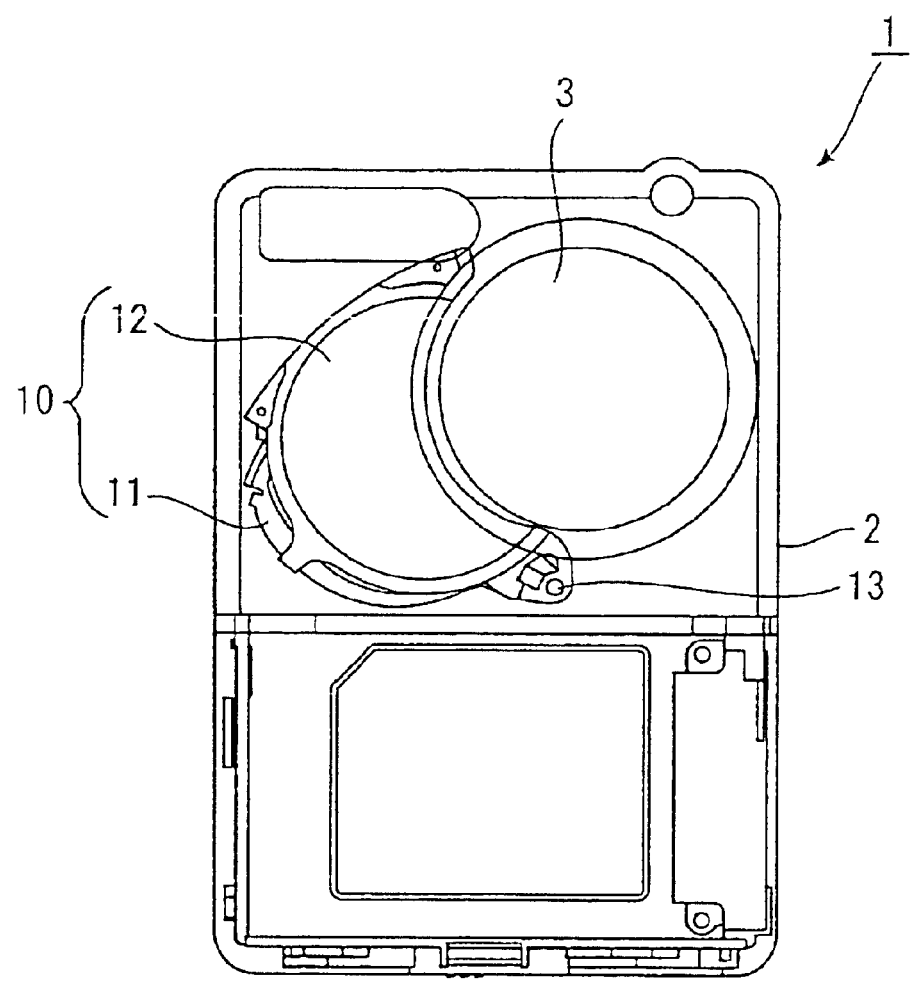
FIG. 4 is a front elevation of the camera in a state that a barrier is opened.

FIG. 1 is an exploded perspective view of a camera 1 showing a lens protector according to an embodiment of the present invention, looking only at a cabinet 2 of the front side of the camera 1 from the rear side. FIG. 1 shows a state before a lens protection barrier 10 and a driving device 31 are mounted on the cabinet 2. FIG. 2 is a rear elevation of the lens protector according to the embodiment of the present invention, in which the barrier 10 is assembled on the cabinet 2. FIG. 3 is a front elevation of the camera 1 in a state that the barrier 10 is closed. FIG. 4 is a front elevation of the camera 1 in a state that the barrier 10 is opened.

According to a lens protector of the present invention, the barrier 10 is divided into two blades 11 and 12. The two blades 11 and 12 are, for example, of a half moon portion and a wane portion. It is preferable that the half moon portion (blade 12) is slightly larger than the wane portion. The two blades 11 and 12 are formed, as shown in FIG. 3, in such a manner that when the blades 11 and 12 covers the lens, the blades 11 and 12 are adjacent to one another to form the circular barrier 10, and when the blades 11 and 12 opens the lens, the wane portion of barrier (the blade 11) is superposed upon the half moon portion of barrier (the blade 12). At the position associated with a lens aperture 3 inside the cabinet 2, there is disposed an image taking lens (not illustrated). When the two blades 11 and 12 are opened, the image taking lens appears through the lens aperture 3. When the two blades 11 and 12 are closed, the front of the image taking lens is closed. The two blades 11 and 12 revolve around the same shaft 13. A position in which the lens aperture 3 is completely covered and a position out of the lens aperture 3 define the revolving range. The two blades 11 and 12 are rotatably mounted on the revolving central shaft 13. A revolving guide guides the revolving blades. Of the two divided blades 11 and 12, a revolving guide 21 for the barrier blade 12 is mounted on the cabinet 2. And a revolving guide 22 for the barrier blade 11 is disposed along a blade surface of the barrier blade 12.

Figure 5:
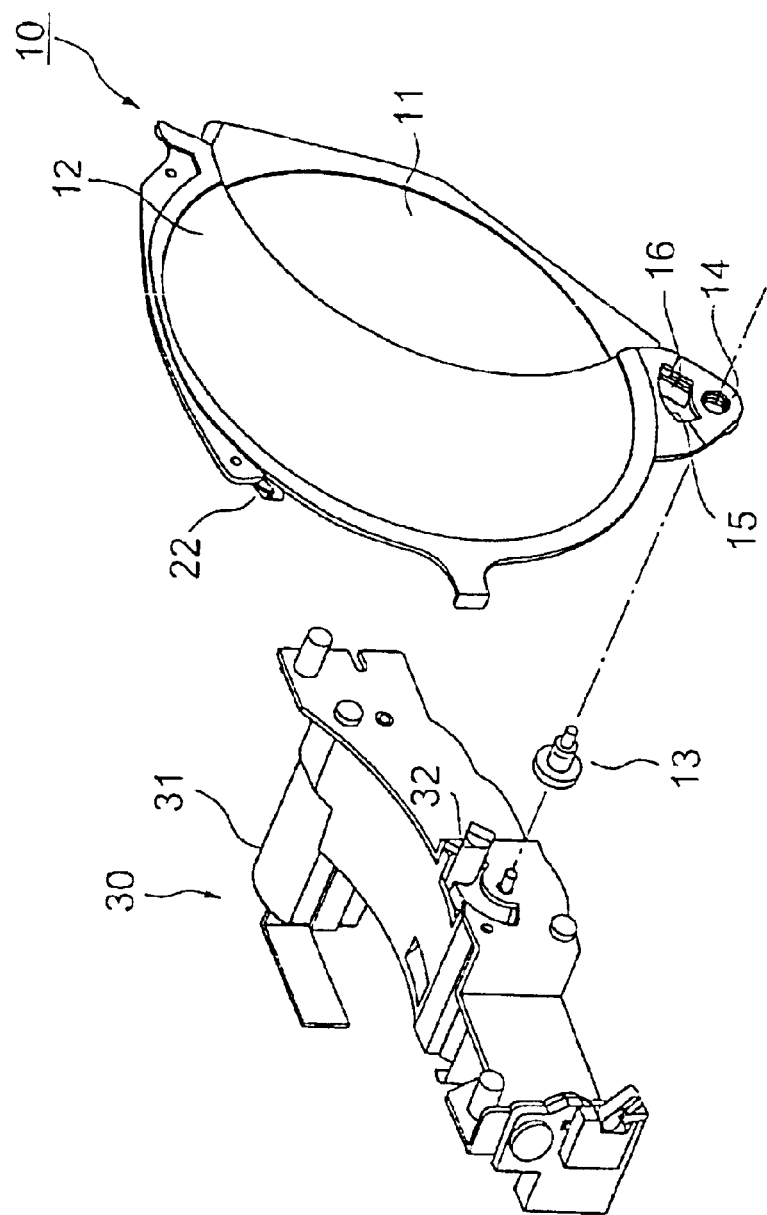
FIG. 5 is a perspective view of a barrier and a driving device for driving the barrier.

FIG. 5 is a perspective view of a barrier and a driving device for driving the barrier.

A driving device 30 is provided with a motor 31. The motor 31 serves to rotatably move an output shaft 32 via several gears. The driving device 30 is provided with the revolving central shaft 13, which is the center of the rotatable movement of the barrier.

On the other hand, the barrier is provided with revolving central holes 14 through which the revolving central shaft 13 penetrates to form a revolving center. The revolving central holes 14 are provided on both the two barrier blades 11 and 12, respectively. The revolving central holes 14, which are provided on both the two barrier blades 11 and 12, are superposed upon each other to penetrate therethrough. The revolving central shaft 13 penetrates through both the revolving central holes 14.

The barrier blade 12 is provided with a fan-shaped opening 15. On the other hand, the barrier blade 11 is provided with an approximately rectangular driving opening 16, which is superposed upon the fan-shaped opening 15 and with which the output shaft 32 is engaged.

The output shaft 32 is engaged with the driving opening 16 and also comes into the fan-shaped opening 15. When the output shaft 32 is driven, the barrier blade 11 revolves on the revolving central shaft 13. When the driving opening 16 reaches one end of the fan-shaped opening 15, the barrier blade 12 revolves together with the barrier blade 11.

The width of the fan-shaped opening 15 is determined in accordance with a revolving direction to offer both a state that as shown in FIG. 4, the two barrier blades 11 and 12 cover the lens aperture 3 in their cooperation and a state that the barrier blade 11 is superposed upon the barrier blade 12.

This driving mechanism does not require many parts and is simple in assembly process, and contributes to saving space as compared with the conventional one.

As mentioned above, according to a lens protector of the present invention, it is simple in mechanism and structure, and it is possible to reduce the parts number. Thus, it is possible to contribute to saving space and cost down.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A lens protector that covers a lens aperture of a cabinet on an open and close basis, the lens protector comprising:

a lens-protecting barrier comprising two barrier blades, which are rotatably mounted around one shaft to cover the lens aperture on a sharing basis, said barrier blades being superposed upon each other when rotated away from the lens aperture.

2. A lens protector according to claim 1, wherein the cabinet has a guide that guides a revolution of one of the two barrier blades.

3. A lens protector according to claim 2, wherein said one of the two barrier blades has a guide that guides a revolution of another of the two barrier blades.

4. A lens protector according to claim 1, wherein one of the two barrier blades has a half moon shape which covers a part of the lens aperture and another of the two barrier blades is a wane portion.

5. A lens protector according to claim 1, wherein the lens protector further has a driving device that causes the two barrier blades to revolve around the shaft.

6. A lens protector according to claim 1, wherein the two barrier blades are each configured to move two-dimensionally.

7. A lens protector according to claim 1, wherein the two barrier blades are positioned inside of the cabinet.

8. A lens protector according to claim 1, wherein the two barrier blades are configured such that one of the two barrier blades is rotated before another of the two barrier blades is moved.

9. A lens protector according to claim 5, wherein the driving device is disposed to move an output shaft along an arc-shaped path.

10. A lens protector according to claim 9, wherein each of the two barrier blades has a driving opening which engages with the output shaft, and wherein the driving opening of one of the two barrier blades is larger than the driving opening of another of the two barrier blades.

* * * * *